United States Patent [19]
Wang et al.

[11] Patent Number: 5,459,762
[45] Date of Patent: Oct. 17, 1995

[54] VARIABLE MULTI-THRESHOLD DETECTION FOR 0.3-GMSK

[75] Inventors: Jiangzhou Wang, Santa Ana; Ker Zhang, Newport Beach, both of Calif.

[73] Assignee: Rockwell International Corporation, Seal Beach, Calif.

[21] Appl. No.: 307,202

[22] Filed: Sep. 16, 1994

[51] Int. Cl.$^6$ .............................. H03D 3/00; H04L 27/14
[52] U.S. Cl. .......................... 375/336; 375/317; 375/274
[58] Field of Search ................................. 375/90, 47, 76, 375/106

[56] References Cited

U.S. PATENT DOCUMENTS

| | | | |
|---|---|---|---|
| 4,096,442 | 6/1978 | McRae et al. | 329/112 |
| 4,387,465 | 6/1983 | Becker | 375/1 |
| 5,001,726 | 3/1991 | Kawai et al. | 375/76 |
| 5,091,920 | 2/1992 | Ikeda et al. | 375/76 |
| 5,151,925 | 9/1992 | Gelin et al. | 375/82 |
| 5,187,719 | 2/1993 | Birgenheier | 375/10 |
| 5,245,611 | 9/1993 | Ling et al. | 370/100.1 |

*Primary Examiner*—Stephen Chin
*Assistant Examiner*—William Luther
*Attorney, Agent, or Firm*—George A. Montanye; David J. Arthur; Philip K. Yu

[57] ABSTRACT

A variable multi-threshold detection circuit for a sampled baseband signal in the receiver of a communication system using GMSK modulation is disclosed. The circuit comprises an integrate/dump circuit for accumulating a predetermined number of samples of the baseband signal to generate a sum for a present bit, a level selector for selecting a threshold from a plurality of groups of multi-thresholds based on an estimated phase offset and the binary value of two previous bits, a compare circuit for comparing the sum from the integrate/dump circuit with the threshold selected from the level selector to generate a binary value of either one of "0" or "1" for the present bit, and a delay circuit for delaying the present bit to be used by the level selector to determine a next threshold for a next bit.

17 Claims, 5 Drawing Sheets

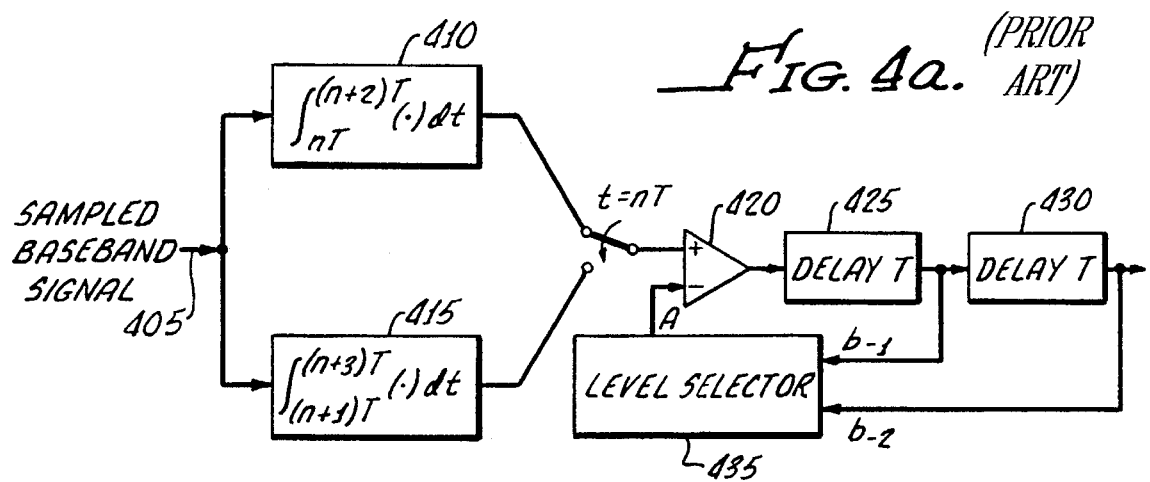
Fig. 4a. (PRIOR ART)
Fig. 4b. (PRIOR ART)
| PREVIOUS BITS | TABLE | (1 GROUP) |
|---|---|---|
| $b_{-1}$ | $b_{-2}$ | THRESHOLD (A) |
| 0 | 0 | $-a_1$ |
| 0 | 1 | $-a_0$ |
| 1 | 0 | $a_0$ |
| 1 | 1 | $a_1$ |
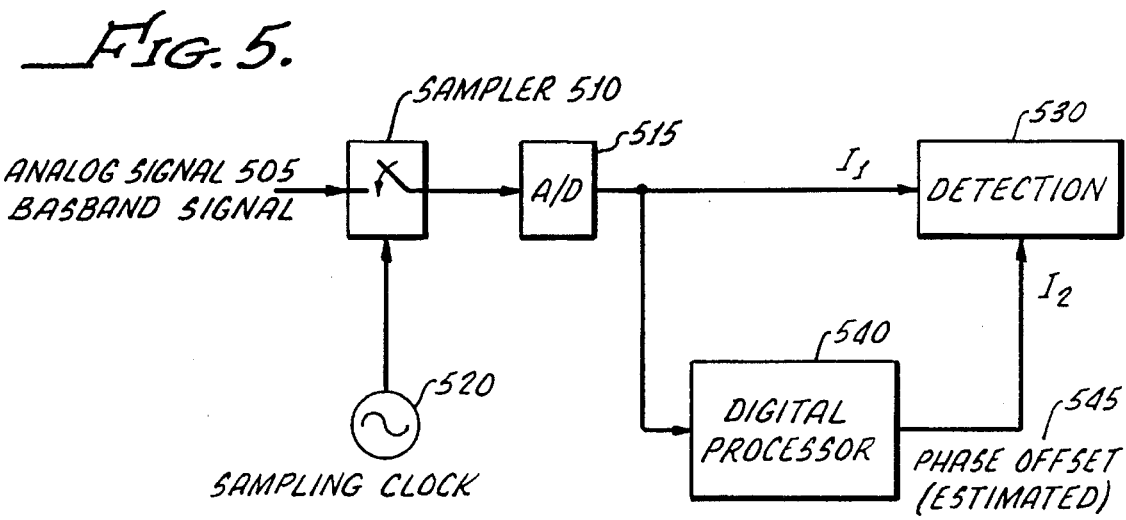
Fig. 5.

| | PHASE OFFSET | 6.25% | 12.5% | 18.75% | 25% | 31.25% | 37.5% | 43.75% | 50% |
|---|---|---|---|---|---|---|---|---|---|
| PREVIOUS BITS | | | | | | | | | |
| $b_{-1}$ | $b_{-2}$ | | | | | | | | |
| 0 | 0 | $-a_1$ | $-a_2$ | $-a_3$ | $-a_4$ | $-a_5$ | $-a_6$ | $-a_7$ | $-a_8$ |
| 0 | 1 | $-a_0$ | $-a_0$ | $-a_0$ | $-a_0$ | $-a_0$ | $-a_0$ | $-a_0$ | $-a_0$ |
| 1 | 0 | $a_0$ | $a_0$ | $a_0$ | $a_0$ | $a_0$ | $a_0$ | $a_0$ | $a_0$ |
| 1 | 1 | $a_1$ | $a_2$ | $a_3$ | $a_4$ | $a_5$ | $a_6$ | $a_7$ | $a_8$ |

THRESHOLDS (A)

\* THE MIDDLE TWO THRESHOLDS ARE FIXED, IRRESPECTIVE OF PHASE OFFSET.

VARIABLE MULTI-THRESHOLD DETECTION FOR 0.3-GMSK

RELATED FIELD

The present invention relates to the field of telecommunication and more specifically to receiving, sampling and detecting signals through a wireless communication system.

ART BACKGROUND

It has been common in the field to use a so-called "0.3-GMSK" modulation scheme for wireless communication, where pre-modulated binary data is mapped to +1/−1 and held for a bit duration (T) and filtered with a Gaussian filter of normalized bandwidth (BT) equal to 0.3, where B is the actual bandwidth of the filter. This filtered signal is then FM modulated with modulation index of 0.5, which is the minimum for an FSK system and hence the term "Minimum Shift Keying (MSK)."

FIG. 1 illustrates a representative 0.3-GMSK system block diagram. On the transmitter side, a bi-polar signal is applied to a Gaussian filter 100, which is connected to a Minimum-Shift-Keying (MSK) 110 before the signal is transmitted to a receiver through an intermediate frequency (IF) to radio frequency (RF) converter 114 and an antenna 115. On the receiver side, the received signal from an antenna 120 goes through an RF-to-IF converter 121 to a bandpass filter 125 connected to a limiter 130, which limits the input signal amplitude. The signal from the limiter 130 is applied to an FM demodulator 140 before the signal is passed through a low-pass filter 150.

The resulting analog signal from the low-pass filter 150 is sampled by a sampler 155, through a sampling clock 156 and converted to digital form by an analog/digital (A/D) converter 160 for digital signal processing. The output of the A/D converter is applied to the detection device 170. However, due to intersymbol interference (ISI) intrinsically generated when the signal is filtered by the Gaussian filter 100 in the transmitter and typically introduced by the propagation channel, as well as the filters in the receiver. Therefore, it is desirable to be able to detect the baseband signal while minimizing the ISI impact at the output of the low-pass filter 150.

The FM-demodulated signal can be detected using fixed multi-threshold detection. However, with fixed multi-threshold detection, the accuracy of the decoded data tends to be sensitive to the corresponding phase offset. Therefore, additional mechanisms are needed to periodically adjust the sample time to ensure the correct phase for the detection scheme. These may include adjusting the sampler clock or using interpolation filters to re-generate the sampling phase. Note that the phase offset is determined by a digital processor, shown in block 230 and 330 of FIGS. 2 and 3, which estimates a sequence of previous samples.

FIGS. 2 and 3 illustrate fixed threshold detection circuits using an interpolation filter and using clock adjustment, respectively. However, as those skilled in the art will appreciate, both the interpolation filter and clock-adjustment would require a more complicated circuit. Therefore, It would be desirable to have a threshold detection circuit without the need to adjust the phases of input signals.

Referring to FIG. 2, the analog signal from the low-pass filter 150 in FIG. 1 is sampled by the sampler 210 according to a sampling clock 240 and quantized by an A/D converter 215. The resulted signal is applied to an interpolation filter 220 with the phase offset information produced by the digital processor 230. The output from the interpolation filter is applied to the detection circuit 250.

Referring to FIG. 3, where the method of clock adjustment is used, the analog signal is sampled by the sampler 310 according to the clock 340 and quantized by an A/D converter 315. Without the interpolation filter, the phase offset is applied to the sampling clock 340 from the digital processor 330.

SUMMARY OF THE PRESENT INVENTION

In order to reduce hardware complexity required by the detection circuitry, a variable multi-threshold detection circuit is disclosed. Based on the estimation of bit timing phase, the corresponding thresholds can be selected. Neither the interpolation filter nor timing phase adjustment is required. What may be required is to estimate a timing phase in order to select a suitable threshold. Based on simulation results, performance can be maintained with a given phase offset by varying the thresholds to optimize the circuitry performance.

A variable multi-threshold detection circuit for a sampled baseband signal in the receiver of a communication system is disclosed. The circuit comprises an integrate/dump filtering circuit which accumulates a predetermined number of samples of the sampled signal to generate a sum for present bit detection, a level selector for selecting a threshold from a plurality of groups of multi-thresholds based on an estimated phase offset and the binary value of two previous bits, a compare circuit for comparing the sum from the integrate/dump circuit with the threshold selected from the level selector to generate a binary value of either one of "0" or "1" for the present bit, and a delay circuit for delaying the present bit to be used by the level selector to determine a next threshold for a next bit.

BRIEF DESCRIPTION OF THE DRAWINGS

Additional objects, features and advantages of the present invention will be apparent from the following description, wherein:

FIG. 4(a) illustrates a four-level detector as used in FIGS. 2 and 3.

FIG. 4(b) is a table of fixed multi-threshold.

FIG. 5 illustrates a detection circuit in accordance with the present invention.

DETAILED DESCRIPTION OF THE DRAWINGS

A variable multi-threshold detection circuit is disclosed. The detailed description that follows is presented largely in terms of algorithms and symbolic representations of operations within an electronics system. They are the means used by those skilled in the telecommunication art to most effectively convey the substance of their work to others skilled in the art.

Figure 1:
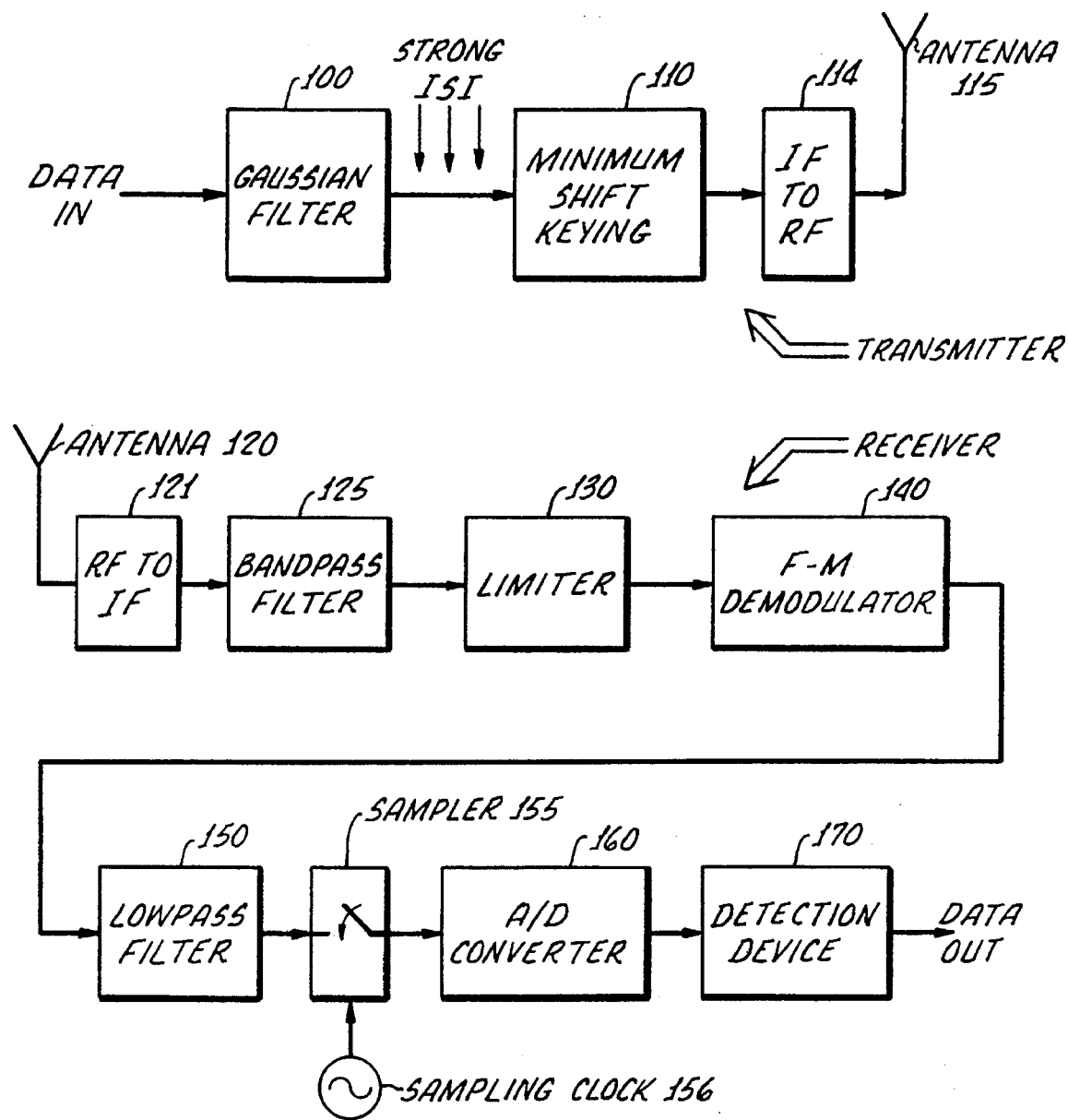
FIG. 1 illustrates a representative 0.3-GMSK system block diagram.
Figure 2:
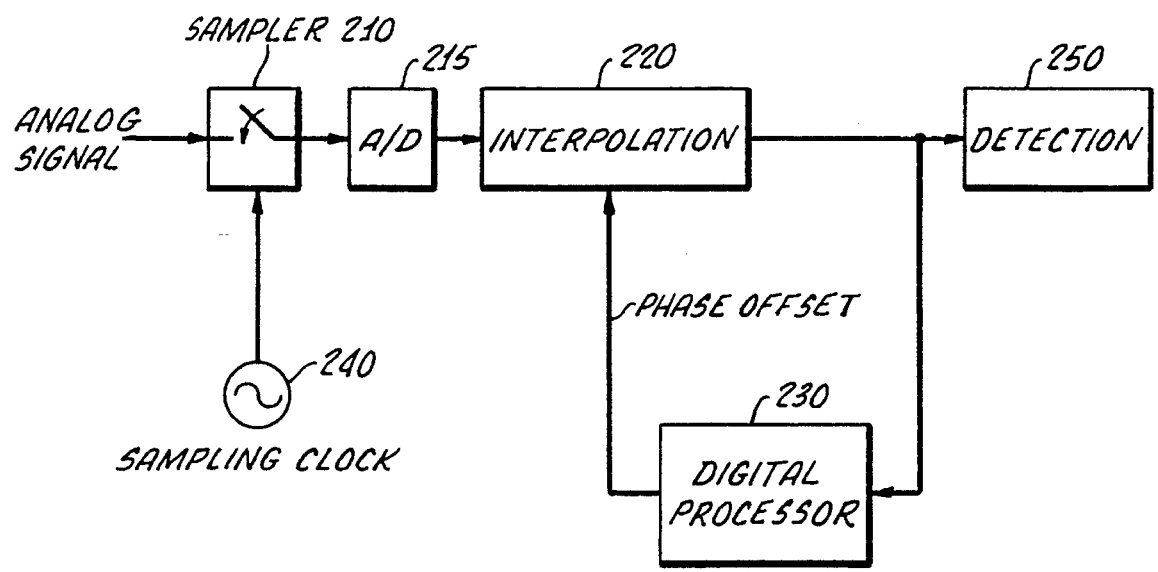
FIG. 2 illustrates a detection circuit with fixed threshold using an interpolation filter.
Figure 3:
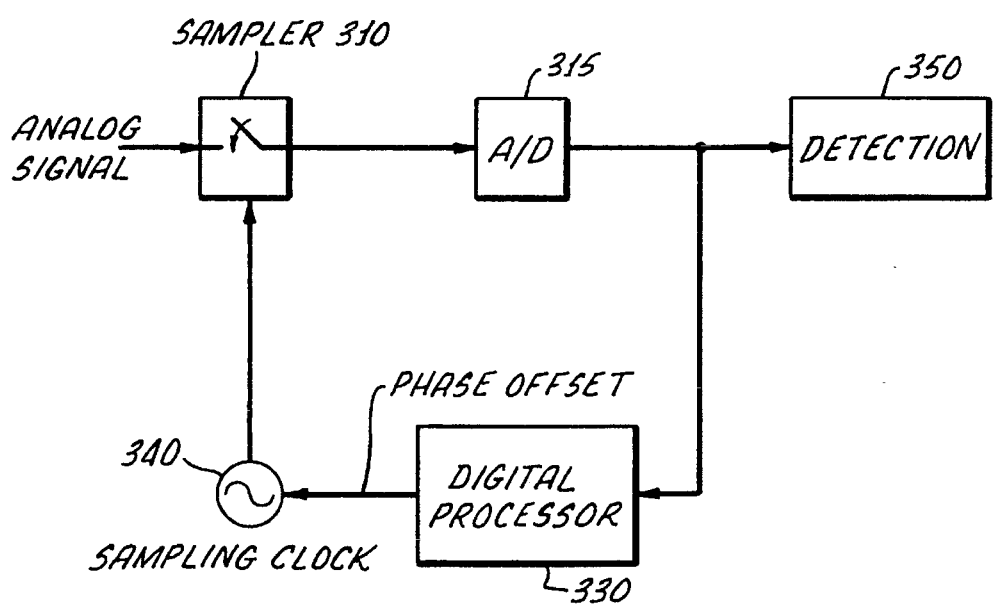
FIG. 3 illustrates a detection circuit with fixed threshold and adjustable sampling clock.

FIG. 4(a) illustrates a four-level detector as used in FIGS. 2 and 3, 250 and 350. Referring to FIG. 4(a), a sampled signal 405, from the output of the interpretation filter 220 of FIG. 2, or from the output of the A/D converter 315 of FIG. 3, is alternately applied to integrate/dump circuits 410 and 415 for even and odd bits integration of 2-bit duration, respectively. To determine the binary value of the current bit, the integrated value is compared with a threshold selected from the table of fixed four thresholds in FIG. 4(b), the selection of which is only based on the binary values of the previous two bits. It should be noted that the group of four thresholds i.e. $-a_1$, $-a_0$, $a_0$ and $a_1$, correspond to a constant phase offset. Alternatively, another group of four thresholds may correspond to another constant phase offset.

FIG. 5 illustrates a detection scheme with variable multi-thresholds. The baseband signal 505 is sampled by the sampler 510 according to the sampling clock 520 and quantized by an A/D converter 515. The resulting signal $I_1$ can then be detected by the detection circuit 530, using the phase offset information $I_2$ obtained from the digital processor 540.

Figures 6, 7:
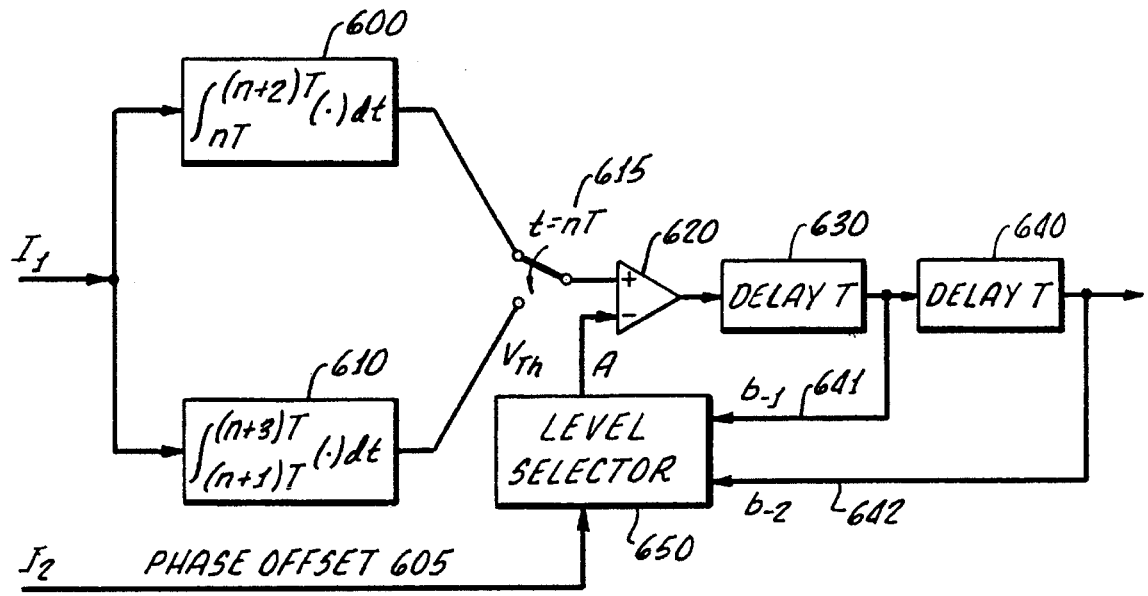
FIG. 6 illustrates a variable multi-threshold detection circuit as used in FIG. 5.
FIG. 7 is a representative table of variable multi-threshold to be implemented with the present invention.

FIG. 6 illustrates a variable multi-thresholds detection circuit 530 as used in FIG. 5. The signal $I_1$ is applied to integrate/dump units 600 and 610, which are alternately connected to the compare unit 620 through a switch 615. The switching rate of the switch 615 equals to data rate. The period of integration 600 and 610 is two-bit duration. The phase offset information I2 is used to select one group of four thresholds for the compare unit 620, based on the previous two bits, 641 and 642, which are generated by the delay units 630 and 640. The groups of four thresholds which can be selected are listed in the table shown in FIG. 7 (to be described below).

FIG. 7 illustrates a representative of eight groups of four thresholds as determined by 2 previous bits, b-1 and b-2,, and an estimated phase offset. The middle two thresholds, $-a_0$ and $+a_0$, for bits "01" and "10" can be fixed, since they generally have little effect from different phase offsets. Therefore, with an estimated phase of, say, 25%, $a_4$ can be used when the previous 2 bits are "11", while $-a_4$ can be used for "00". Therefore, for eight groups of four-thresholds, only half of the thresholds need to be adjusted, based on eight different phase offsets. Those skilled in the art may find different numbers of groups suitable for their systems. However, the system with eight groups is generally efficient enough for most applications.

It should be noted that currently two bits are used to select a threshold for the reason that these two previous bits have ISI impact on the present bit. However, using only one previous bit with two-thresholds may reduce complexity at expense of performance.

Figure 8:
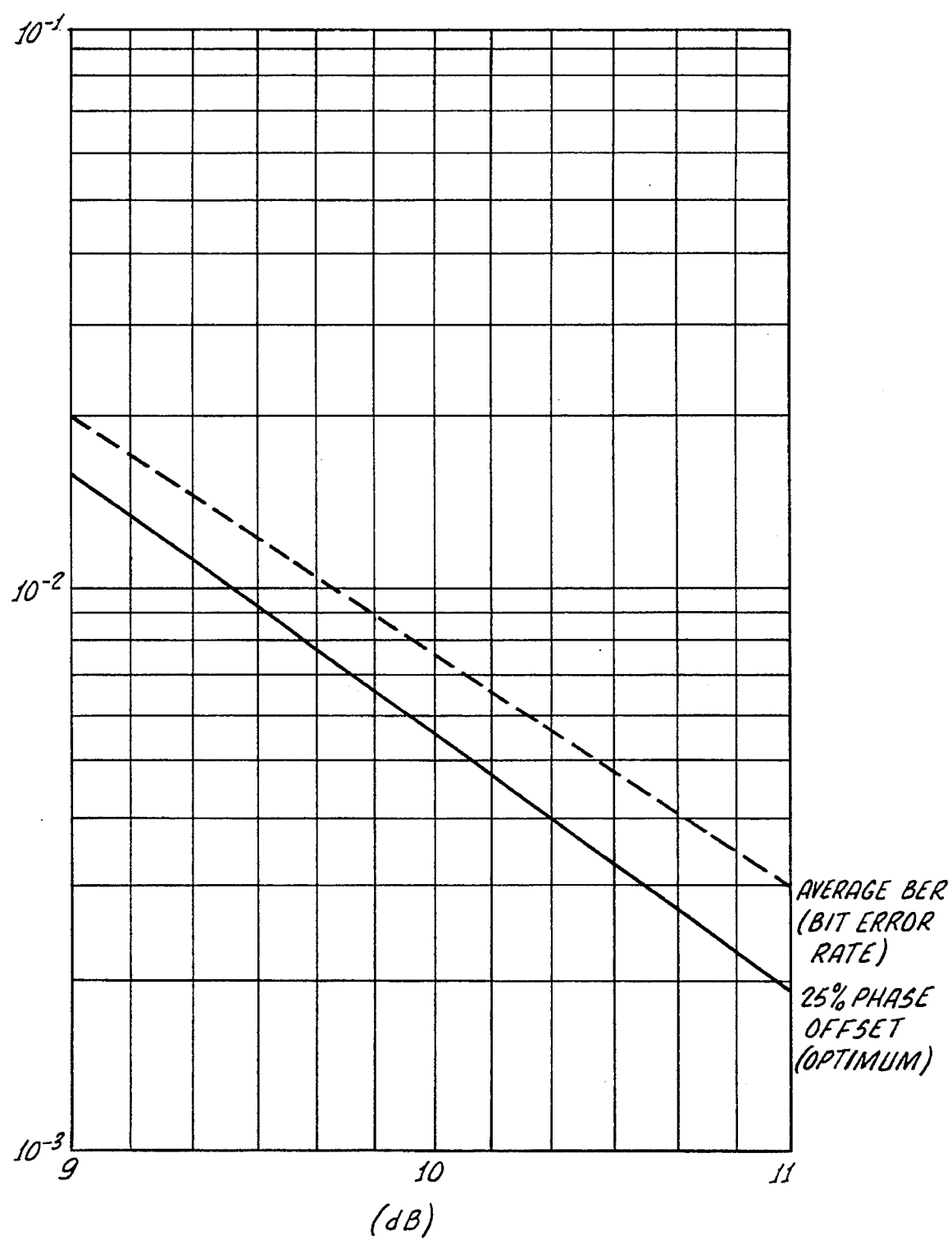
FIG. 8 is a simulated bit error rate chart illustrating the performance of the variable multi-threshold detection in accordance with the present invention.

FIG. 8 is a simulated bit-error-rate (BER) chart for the variable four-threshold detection in accordance with the present invention. Note that the BER performance shown by the dotted line is similar to that using fixed multi-threshold detection at 25% phase offset. However, as those skilled in the arts will appreciate, the present invention can be implemented with circuits with much less complexity. Therefore, the present invention provides an extremely economically feasible alternative to the conventional system.

While the present invention has been described in connection with a communication system using 0.3-GMSK modulation, it should be apparent to those skilled in the art that the present invention can readily be applied to GMSK modulation with BT value between 0.2 and 0.5. Additionally, other filtering schemes such as "raised-cosine" can also be adapted to take advantage of the present invention.

What is claimed is:

1. A variable multi-threshold detection circuit for a sampled baseband signal in the receiver of a communication system using 0.3-GMSK modulation in the transmitter, comprising:

integrate/dump means for accumulating a predetermined number of samples of said sampled signal to generate a sum for a present bit;

means for providing a predetermined number of previous bits relative to said present bit;

digital processing means for generating an estimated phase offset based on said predetermined number of previous bits;

means coupled to said digital processing means for generating a binary value based on said predetermined number of previous bits;

level selector means for selecting a threshold from a plurality of groups of multi-thresholds based on said estimated phase offset and said binary value of said predetermined number of previous bits;

compare means for comparing the sum from said integrate/dump means with said threshold selected from said level selector means to generate a binary value of either one of "0" or "1" representative of said present bit; and delay means for delaying said present bit as determined from said compare means to be used by said level selector means to determine a next threshold for a next bit.

2. A detection circuit according to claim 1, wherein:

said integrate/dump means comprises first and second integrate/dump circuits for alternately accumulating the samples of two-bit duration from even and odd bits and outputting the sum, respectively, each bit having a predetermined number of samples.

3. A detection circuit according to claim 2, wherein:

said level selector means comprises a plurality of groups of first positive threshold ($a_i$), second positive threshold ($a_0$), second negative threshold ($-a_0$), and first negative threshold ($-a_i$), where "$a_i$" is greater than "$a_0$", each "$a_0$" and "$-a_0$" being of predetermined values for all groups, the selection of one of "$a_i$", "$a_0$", "$-a_0$" and "$-a_i$" thresholds being based on the binary values of two previous bits and said estimated phase offset.

4. A detection circuit according to claim 3, wherein each group of thresholds corresponds to a phase offset of 6.25% from previous group and the "$a_i$", "$a_0$", "$-a_0$" and "$-a_i$" thresholds within each group correspond to the binary values of "11", "10", "01" and "00", respectively.

5. A method of detecting a plurality of bits of a sampled baseband signal using variable multi-thresholds in a receiver of a communication system with GMSK modulation in its transmitter, comprising the steps of:

sampling said baseband signal to generate said sampled baseband signal with a predetermined number of samples per bit;

providing at least 2 previous bits relative to said plurality of bits;

integrating a plurality of samples within said plurality of present bits to generate a sum corresponding to said plurality of present bits;

estimating a phase offset of said sampled baseband signal based on said at least 2 previous bits;

generating a binary decision value representative of said at least 2 previous bits;

selecting a threshold from a plurality of groups of multi-thresholds based on said phase offset and the binary decision values of said at least two (2) previous bits;

comparing said sum with said threshold selected to determine a binary decision value representative of said plurality of present bits;

delaying said binary decision value representative of said plurality of present bits after comparing for selecting the next threshold for the next bit.

6. A method according to claim 5, wherein the step of selecting said threshold selects said threshold from a plurality of four-threshold groups, each group being selectable by a predetermined phase offset, each of said four-thresholds being selectable by a predetermined binary value of the two previous bits.

7. A method according to claim 6, wherein each of said plurality of four-threshold groups corresponds to a phase offset of 6.25%.

8. A method according to claim 7, wherein each group of four-thresholds comprises a negative first threshold, a negative second threshold, a positive second threshold and a positive first threshold corresponding to the binary values of "00", "01", "10" and "11", respectively.

9. A method according to claim 8, wherein said second and third thresholds for all groups are predetermined, irrespective of the phase offset associated with each group.

10. The method according to claim 9, wherein said GMSK modulation in the transmitter has BT =0.3.

11. The method according to claim 9, wherein said GMSK modulation in the transmitter has BT between 0.2 and 0.5.

12. The method according to claim 9, wherein said GMSK modulation utilizes a "raised-cosine" filtering scheme.

13. A variable multi-threshold circuit for a sampled baseband signal in the receiver of a communication system using GMSK modulation with BT between 0.2 and 0.5 in the transmitter, comprising:

integrate/dump means for accumulating a predetermined number of samples of said sampled signal to generate a sum for a present bit;

means for providing a predetermined number of previous bits relative to said present bit;

digital processing means for generating an estimated phase offset based on said predetermined number of previous bits;

means coupled to said digital processing means for generating a binary value representative of said predetermined number of previous bits;

level selector means for selecting a threshold from a plurality of groups of multi-thresholds based on said estimated phase offset and the binary value of said predetermined number of previous bits;

compare means for comparing the sum from said integrate/dump means with said threshold selected from said level selector means to generate a binary value of either one of "0" or "1" for said present bit; and delay means for delaying said binary value representative of said present bit from said compare means to be used by said level selector means to determine a next threshold for a next bit.

14. A detection circuit according to claim 11 wherein:

said integrate/dump means comprises first and second integrate/dump circuits for alternately accumulating the samples of two-bit duration from even and odd bits and outputting the sum, respectively, each bit having a predetermined number of samples.

15. A detection circuit according to claim 14, wherein:

said level selector means comprises a plurality of groups of first positive threshold ($a_i$), second positive threshold ($a_0$), second negative threshold ($-a_0$), and first negative threshold ($-a_i$), where "$a_i$" is greater than "$a_0$", each "$a_0$" and "$-a_0$" being of predetermined values for all groups, the selection of one of "$a_i$", "$a_0$", "$-a_0$" and "$-a_i$" thresholds being based on the binary values of two previous bits and said estimated phase offset.

16. A detection circuit according to claim 14, wherein each group of thresholds corresponds to a phase offset of 6.25% from previous group and the "$a_i$", "$a_0$", "$-a_0$" and "$-a_i$" thresholds within each group correspond to the binary values of "11", "10", "01" and "00" respectively.

17. A detection circuit according to claim 14 wherein said detection circuit is used in connection with a "raise-cosine" filtering scheme in the transmitter.

* * * * *